US006144707A

United States Patent [19]

Yoshida et al.

[11] Patent Number: 6,144,707

[45] Date of Patent: Nov. 7, 2000

[54] APPARATUS FOR RECEIVING BROADCASTING SIGNALS

[75] Inventors: Tadao Yoshida; Tadashi Okamoto, both of Kanagawa, Japan

[73] Assignee: Sony Corporation, Tokyo, Japan

[21] Appl. No.: 09/059,306

[22] Filed: Apr. 14, 1998

[30] Foreign Application Priority Data

Apr. 23, 1997 [JP] Japan .................................... 9-105845

[51] Int. Cl.[7] .............................. H04L 27/06; H04H 5/00

[52] U.S. Cl. ................................................ 375/316; 381/2

[58] Field of Search .................................... 375/260, 316, 375/341, 332; 381/2, 3.2, 6.3, 7; 455/42, 93, 110, 205, 3.2; 329/315, 300, 345, 347

[56] References Cited

U.S. PATENT DOCUMENTS

| | | | |
|---|---|---|---|
| 5,278,826 | 1/1994 | Murphy et al. | 370/208 |
| 5,452,288 | 9/1995 | Rahuel et al. | 375/260 |
| 5,455,823 | 10/1995 | Noreen et al. | 455/3.2 |
| 5,535,240 | 7/1996 | Carney et al. | 375/260 |
| 5,825,241 | 10/1998 | Beale et al. | 375/261 |
| 5,862,189 | 1/1999 | Huisken et al. | 375/341 |
| 5,943,371 | 8/1999 | Beale et al. | 375/341 |
| 5,946,292 | 8/1999 | Tsujishita et al. | 375/327 |
| 5,946,293 | 8/1999 | Beale et al. | 375/260 |

*Primary Examiner*—Tesfaldet Bocure
*Attorney, Agent, or Firm*—Jay H. Maioli

[57] ABSTRACT

An apparatus for receiving broadcasting signals, which includes a tuner for receiving a digital audio broadcasting signal, a data demodulating portion for obtaining time interleaved information data based on the digital audio broadcasting signal received by the tuner, a time de-interleaving portion for causing the time interleaved information data to be subjected to a time de-interleaving arrangement, an audio signal reproducing portion for obtaining a reproduced audio signal based on time de-interleaved information data obtained from said time de-interleaving portion, a RAM for storing unit data constituting the time interleaved information data therein and reading stored unit data therefrom when the time interleaved information data are subjected to the time de-interleaving arrangement, and a memory control portion for controlling storage of the unit data in the RAM and for reading the stored unit data from the RAM and operative to utilize a part of the RAM which is not used for storing and reading the unit data for storing data other than the unit data therein and reading stored data therefrom.

6 Claims, 3 Drawing Sheets

APPARATUS FOR RECEIVING BROADCASTING SIGNALS

BACKGROUND OF THE INVENTION

1. Field of the Invention

The present invention relates generally to an apparatus for receiving broadcasting signals, and more particularly, to a broadcasting signal receiving apparatus which is operative to receive a digital audio broadcasting signal and to obtain a reproduced audio signal based on the digital audio broadcasting signal received thereby.

2. Description of the Prior Art

Although an analog audio broadcasting system which includes an amplitude-modulated (AM) audio broadcasting system in which audio signals are transmitted in the form of an AM audio information signal and a frequency-modulated (FM) audio broadcasting system in which audio signals are transmitted in the form of a FM audio information signal, has been put to practical use for a long time in the field of audio broadcasting, it has recently been proposed to introduce a digital audio broadcasting system in which audio signals are transmitted in the form of digital audio information signals for the purpose of improving the quality of audio information transmitted or received in the system. Especially, in Europe, the digital audio broadcasting system called "DAB" has been already put to practical use in some countries.

The digital audio information signal transmitted from a broadcasting station using the digital audio broadcasting system is called a digital audio broadcasting signal. The digital audio broadcasting signal carries not only audio information data forming a digital audio signal but also service information data representing service information, such as weather forecast, traffic information and so on, and further carries control information data which are necessitated for reproducing the digital audio signal based on the audio information data and the service information based on the service information data on the receiving side. Both the audio information data and service information data usually contain various kinds of program information data.

The audio information data and service information data contained in the digital audio broadcasting signal are usually subjected respectively to time interleaving arrangements for the purpose of minimizing deterioration resulting from data bit omission, data bit transformation and so on occurring on transmission. Each of the audio information data and service information data are transmitted in the form of a series of unit segments each having a time duration of, for example, 24 ms and constituting a logical frame. The time interleaving arrangement to which each of the audio information data and service information data are subjected is carried out on each interleaving completion segment consisting of successive sixteen logical frames. Accordingly, time interleaved audio information data or time interleaved service information data corresponding to each original group of successive sixteen logical frames constitute a new group of successive sixteen logical frames.

The logical frame consists of a series of, for example, 864 unit data each constituting a capacity unit (CU) which corresponds to 64 bits to form a minimum data segment. Accordingly, the logical frame corresponds to 64×864=55,296 bits. In case of the audio information data or service information data containing various kinds of program information data, the quantity of data contained in each of the logical frames constituting a single kind of program information data amounts to, for example, 140 capacity units (140×64=8,960 bits) at the maximum.

Such a digital audio broadcasting signal as described above is received by use of a digital audio broadcasting receiver. In the digital audio broadcasting receiver, each of the digital audio broadcasting signals transmitted respectively from a plurality of broadcasting stations is received selectively through a tuning operation by a tuner and the received digital audio broadcasting signal is subjected to a demodulation processing so as to produce control information data, time interleaved audio information data and time interleaved service information data. Each of the time interleaved audio information data and time interleaved service information data are subjected to a time de-interleaving arrangement to be released from the time interleaving arrangement to return the original audio information data or original service information data.

The time de-interleaving arrangement to which each of the time interleaved audio information data and time interleaved service information data are subjected is carried out usually in accordance with the following first and second steps. In the first step, one of various kinds of program information data contained in the time interleaved audio information data or time interleaved service information data are selected. In the second step, the selected program information data are subjected to a time de-interleaving arrangement to be released from the time interleaving arrangement to return the original program information data. As a result, the original program information data are obtained as time de-interleaved audio information data or time de-interleaved service information data.

Then, with the participation of the control information data, audio program data based on the time de-interleaved audio information data and service program data based on the time de-interleaved service information data are separately obtained. The audio program data are subjected to a decoding processing to produce a digital audio signal and a reproduced audio signal is obtained based on the digital audio signal. The service program data are also subjected to a decoding processing by which reproduced service data are obtained.

The time de-interleaving arrangement to which each of the time interleaved audio information data and time interleaved service information data obtained through the demodulation processing on the received digital audio broadcasting signal are subjected is carried out to each interleaving completion segment consisting of, for example, successive sixteen logical frames which are contained in each of the time interleaved audio information data and time interleaved service information data. Therefore, for example, a circuit structure as shown in FIG. 1 is used for such time de-interleaving arrangement as described above. The circuit structure shown in FIG. 1 comprises a program selector 11, a time de-interleaving portion 12, a random access memory (RAM) 13 forming a memory device and a control unit 14.

In the circuit structure shown in FIG. 1, composite data Dxd containing the time interleaved audio information data and time interleaved service information data which are obtained through the demodulation processing to which the received digital audio broadcasting signal is subjected, are supplied to the program selector 11. A program selection control signal Csp is also supplied to the program selector 11 from the control unit 14. In the program selector 11, a data selection by which one of various kinds of the program information data contained in the audio information data constituting the composite data Dxd or one of various kinds of the program information data contained in the service information data constituting the composite data Dxd are selected is carried out in response to the program selection control signal Csp and program information data Dpd selected by the data selection are derived from the program selector 11 to be supplied to the time de-interleaving portion 12.

In the time de-interleaving portion 12 and the RAM 13 connected to the time de-interleaving portion 12, first, a plurality of capacity units Dpu, each of which forms unit data of 64 bits and which constitute the program information data Dpd contained in successive sixteen logical frames derived from each of interleaving completion segments of the composite data Dxd, are successively stored in the RAM 13. Then, after the whole capacitor units Dpu forming the unit data constituting the program information data Dpd contained in those successive sixteen logical frames are once stored in the RAM 13, the capacitor units Dpu stored in the RAM 13 are read from the RAM 13 in a predetermined de-interleaving manner so as to produce time de-interleaved program information data Dpd' contained in new successive sixteen logical frames so that the time de-interleaving arrangement is carried out to the program information data Dpd.

The time de-interleaved program information data Dpd' are derived from the time de-interleaving portion 12 to be time de-interleaved audio information data or time de-interleaved service information data.

As described above; the time de-interleaving arrangement to which each of the time interleaved audio information data and time interleaved service information data are subjected is carried out to each interleaving completion segment consisting of, for example, successive sixteen logical frames. Therefore, when the time interleaved audio information data or time interleaved service information data are subjected to the time de-interleaving arrangement, a memory device used for the time de-interleaving arrangement, such as the RAM 13 shown in FIG. 1, is required. The Ram is necessary to provide an appropriate arrangement under any possible data condition, and to have such bit capacity as necessary for a time de-interleaving arrangement carried out on the time interleaved audio information data and time interleaved service information data, each of which has been subjected to a time interleaving arrangement carried out to each interleaving completion segment consisting of successive sixteen logical frames each provided with sufficient data to be in a full condition.

The bit capacity necessary for the time de-interleaving arrangement carried out on both the time interleaved audio information data and time interleaved service information data, each of which has been subjected to the time interleaving arrangement carried out to each interleaving completion segment consisting of successive sixteen logical frames in the full condition, is expressed with the formula : $64\times864\times16\times n/2$, provided that each logical frame contains successive 864 capacity units, each capacity unit consists of 64 bit, and n is the number of bits of soft decision in a Viterbi decoding processing for error correction to which time de-interleaved audio information data and time de-interleaved service information data are to be subjected, and n is usually selected to be 4 in the case of the audio information data and service information data.

Accordingly, the bit capacity necessary for the time de-interleaving arrangement carried out on both the time interleaved audio information data and time interleaved service information data, each of which has been subjected to the time interleaving arrangement carried out on each interleaving completion segment consisting of successive sixteen logical frames in the full condition is, for example, $64\times864\times16\times4/2=1{,}769{,}472\approx1.77$ megabits.

Generally, since RAMs supplied for wide use are used for constituting almost all of such memory devices as the RAM 13 shown in FIG. 1, a RAM having the bit capacity of 2 megabits or more than 2 megabits may be used for constituting the memory device having the bit capacity of 1.77 megabits to be used for the time de-interleaving arrangement. That is, it is usual that the memory device used for the time de-interleaving arrangement to which the time interleaved audio information data and time interleaved service information data are subjected, such as the RAM 13 shown in FIG. 1, has the bit capacity of 2 megabits or more.

However, in fact, in the time de-interleaving arrangement to which each of the time interleaved audio information data and time interleaved service information data are subjected, one of various kinds of program information data selected to be extracted from the time interleaved audio information data or time interleaved service information data are actually subjected to the time de-interleaving arrangement. The quantity of data contained in the selected single kind of program information data amounts to, for example, 140 capacity units, namely $64\times140=8{,}960$ bits, at the maximum, as aforementioned.

Accordingly, the bit capacity necessary for the time de-interleaving arrangement carried out on the selected single kind of program information data is expressed with the formula: $64\times140\times16\times n/2$, and consequently results in $64\times140\times16\times4/2=286{,}720\approx0.3$ megabits, provided that n equals 4.

This means that, although the memory device provided previously for the time de-interleaving arrangement to which the time interleaved audio information data and time interleaved service information data are subjected, such as the RAM 13 shown in FIG. 1, has the bit capacity of 2 megabits or more, only the bit capacity of 0.3 megabits or less of the bit capacity of 2 megabits or more, namely about one-sixth or less of the bit capacity of 2 megabits or more, is actually used for storing the unit data (capacity units) constituting the selected single kind of program information data.

Even if two of various kinds of program information data are selected to be extracted from the time interleaved audio information data or time interleaved service information data for the time de-interleaving arrangement, the bit capacity of the memory device used for storing the unit data constituting the selected two kinds of program information data comes to $0.3\times2=0.6$ megabits or less and this bit capacity is considerably small compared with the bit capacity of 2 megabits or more of the memory device.

As described above, as for the memory device provided previously for the time de-interleaving arrangement to which the time interleaved audio information data and time interleaved service information data are subjected, such as the RAM 13 shown in FIG. 1, a major part of the bit capacity thereof is not actually used and therefore efficiency of utilization is very low.

OBJECTS AND SUMMARY OF THE INVENTION

Accordingly, it is an object of the present invention to provide an apparatus for receiving broadcasting signals, by which a digital audio broadcasting signal is received, time interleaved information data obtained from the received digital audio broadcasting signal are subjected to a time de-interleaving arrangement to be released from a time interleaving arrangement, and an audio signal is reproduced based on time de-interleaved information data, and which avoids the aforementioned disadvantages encountered with the prior art.

Another object of the present invention is to provide an apparatus for receiving broadcasting signals, by which a digital audio broadcasting signal is received, time interleaved information data obtained from the received digital audio broadcasting signal are subjected to a time de-interleaving arrangement to be released from a time interleaving arrangement, and an audio signal is reproduced based on time de-interleaved information data, and in which the bit capacity of a memory device provided for the time de-interleaving arrangement to which the time interleaved information data are subjected can be effectively used so that the memory device is improved in efficiency of utilization.

A further object of the present invention is to provide an apparatus for receiving broadcasting signals, by which a digital audio broadcasting signal is received, time interleaved information data obtained from the received digital audio broadcasting signal are subjected to a time de-interleaving arrangement to be released from a time interleaving arrangement, and an audio signal is reproduced based on time de-interleaved information data, and in which a memory device provided for the time de-interleaving arrangement to which the time interleaved information data are subjected is used for storing various data obtained based on the time de-interleaved information data and therefore the bit capacity of the memory device can be effectively used so that the memory device is improved in efficiency of utilization.

A still further object of the present invention is to provide an apparatus for receiving broadcasting signals, by which a digital audio broadcasting signal is received, time interleaved information data obtained from the received digital audio broadcasting signal are subjected to a time de-interleaving arrangement to be released from a time interleaving arrangement, and an audio signal is reproduced based A on time de-interleaved information data, and in which a memory device provided for the time de-interleaving arrangement to which the time interleaved information data are subjected is used also for storing data participating in data processings in an operation control portion and therefore the bit capacity of the memory device can be effectively used so that the memory device is improved in efficiency of utilization.

According to the present invention, there is provided an apparatus for receiving broadcasting signals, which comprises a tuning portion for receiving selectively digital audio broadcasting signals, a data demodulating portion for obtaining time interleaved information data based on the digital audio broadcasting signal received by the tuning portion, a time de-interleaving portion for causing the time interleaved information data obtained from the data demodulating portion to be subjected to a time de-interleaving arrangement, an audio signal reproducing portion for obtaining a reproduced audio signal based on time de-interleaved information data obtained from the time de-interleaving portion, a memory portion for storing unit data constituting the time interleaved information data therein and reading stored unit data therefrom when the time interleaved information data are subjected to the time de-interleaving arrangement, and a memory control portion for controlling storage of the unit data constituting the time interleaved information data in the memory portion and reading of the stored unit data from the memory portion and operative to utilize a part of the memory portion which is not used for storing and reading the unit data for storing data other than the unit data therein and reading stored data therefrom.

In the apparatus for receiving broadcasting signals thus constituted in accordance with the present invention, under the control by the memory control portion, the memory portion provided for the time de-interleaving arrangement to which the time interleaved information data are subjected is used not only for storing the unit data constituting the time interleaved information data therein and reading the stored unit data therefrom when the time de-interleaving arrangement is carried out but also for storing the data other than the unit data into the part thereof which is not used for storing and reading the unit data and reading the stored data from that part thereof. Accordingly, the bit capacity of the memory portion provided for the time de-interleaving arrangement to which the time interleaved information data are subjected can be effectively used without interfering with the time de-interleaving arrangement so that the memory portion is improved in efficiency of utilization.

In an embodiment of apparatus for receiving broadcasting signals according to the present invention, the memory control portion is operative to utilize the part of the memory portion which is not used for storing and reading the unit data for storing control information data, program associated data or packet data contained in audio program data obtained based on the time de-interleaved information data, or bit streams based on the audio program data therein and reading stored data therefrom.

In such an embodiment, the memory portion provided for the time de-interleaving arrangement to which the time interleaved information data are subjected is used not only for storing the unit data constituting the time interleaved information data therein and reading the stored unit data therefrom when the time de-interleaving arrangement is carried out but also for storing the control information data, the program associated data or packet data contained in the audio program data obtained based on the time de-interleaved information data, or the bit streams based on the audio program data therein and reading stored data therefrom. Accordingly, the bit capacity of the memory portion provided for the time de-interleaving arrangement to which the time interleaved information data are subjected can be effectively used without interfering with the time de-interleaving arrangement so that the memory portion is improved in efficiency of utilization. Further, a separate memory portion for storing the control information data, the program associated data or packet data contained in the audio program data obtained based on the time de-interleaved information data, or the bit streams based on the audio program data therein and reading the stored data therefrom can be omitted or reduced effectively in bit capacity.

In another embodiment of apparatus for receiving broadcasting signals according to the present invention, the memory control portion is operative to utilize the part of the memory portion which is not used for storing and reading the unit data for storing data which are used for data processings in an operation control portion for controlling operations of the tuning portion, data demodulating portion and audio signal reproducing portion therein and reading stored data therefrom.

In such an embodiment, the memory portion provided for the time de-interleaving arrangement to which the time interleaved information data are subjected is used not only for storing the unit data constituting the time interleaved information data therein and reading the stored unit data therefrom when the time de-interleaving arrangement is carried out but also for storing the data which are used for the data processings in the operation control portion for controlling operation of the tuning portion, data demodulating portion and audio signal reproducing portion therein and reading stored data therefrom. Accordingly, the bit capacity of the memory portion provided for the time de-interleaving arrangement to which the time interleaved information data are subjected can be effectively used without interfering with the time de-interleaving arrangement so that the memory portion is improved in efficiency of utilization. Further, a memory portion built in or accompanying the operation control portion for controlling in operation the tuning portion, data demodulating portion and audio signal reproducing portion can be omitted or reduced effectively in bit capacity.

The above, and other objects, features and advantages of the present invention will be become apparent from the following detailed description taken in conjunction with the accompanying drawings.

DESCRIPTION OF THE PREFERRED EMBODIMENT

Figure 2:
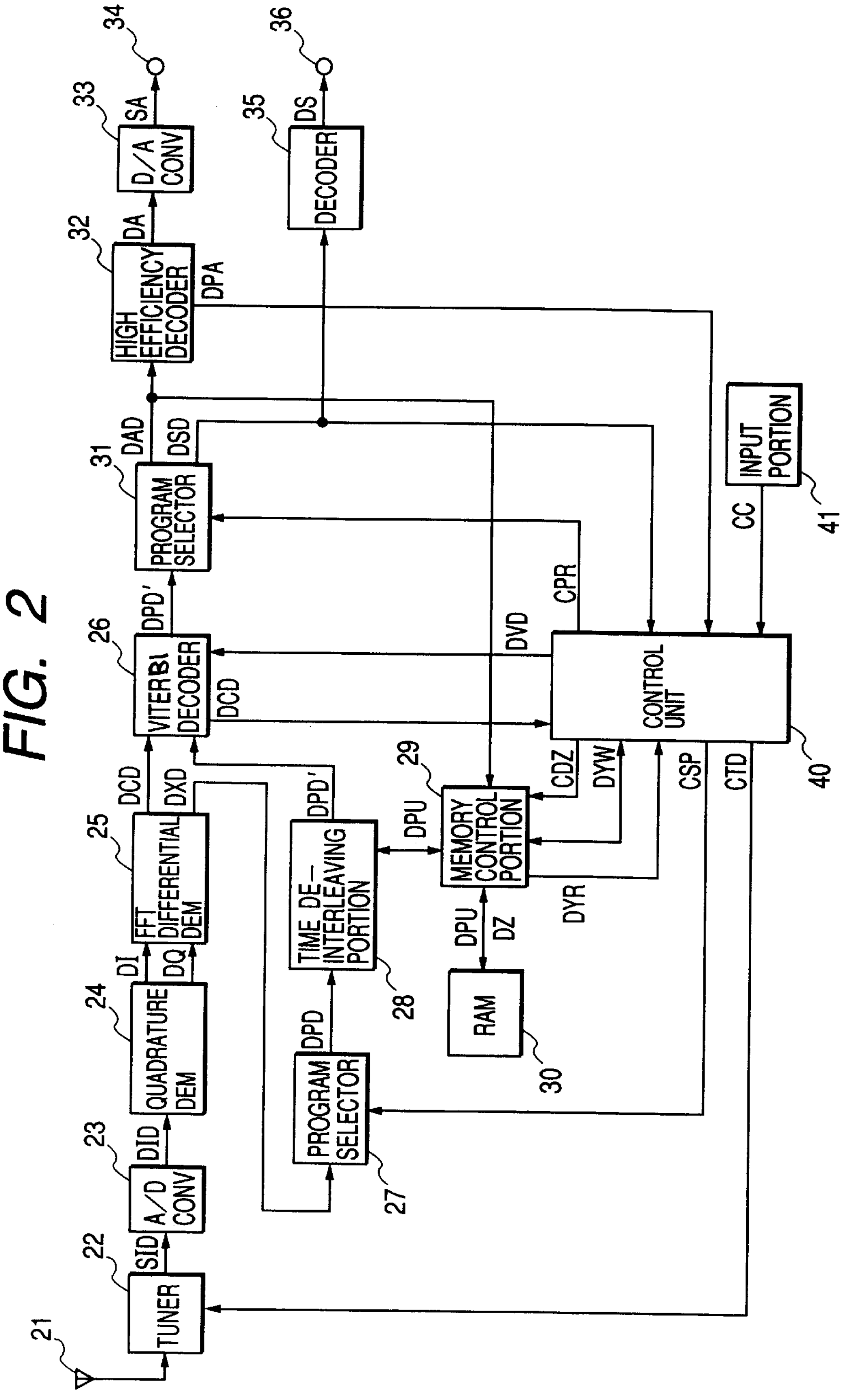
FIG. 2 is a schematic block diagram showing an embodiment of apparatus for receiving broadcasting signals according to the present invention.

FIG. 2 shows schematically an embodiment of apparatus for receiving broadcasting signals according to the present invention.

Referring to FIG. 2, in the embodiment, a digital audio broadcasting signal transmitted from a broadcasting station and having reached to a receiving antenna 21 is received through a tuning operation by a tuner 22.

The digital audio broadcasting signal received by the tuner 22 is a modulated wave signal obtained by modulating a carrier wave signal with digital data in accordance with the Orthogonal Frequency Division Multiplexing (OFDM) system and the digital data is composed of a series of frame units, each of which is called a transmission frame.

Figures 3A, 3B, 3C, 3D, 3E:
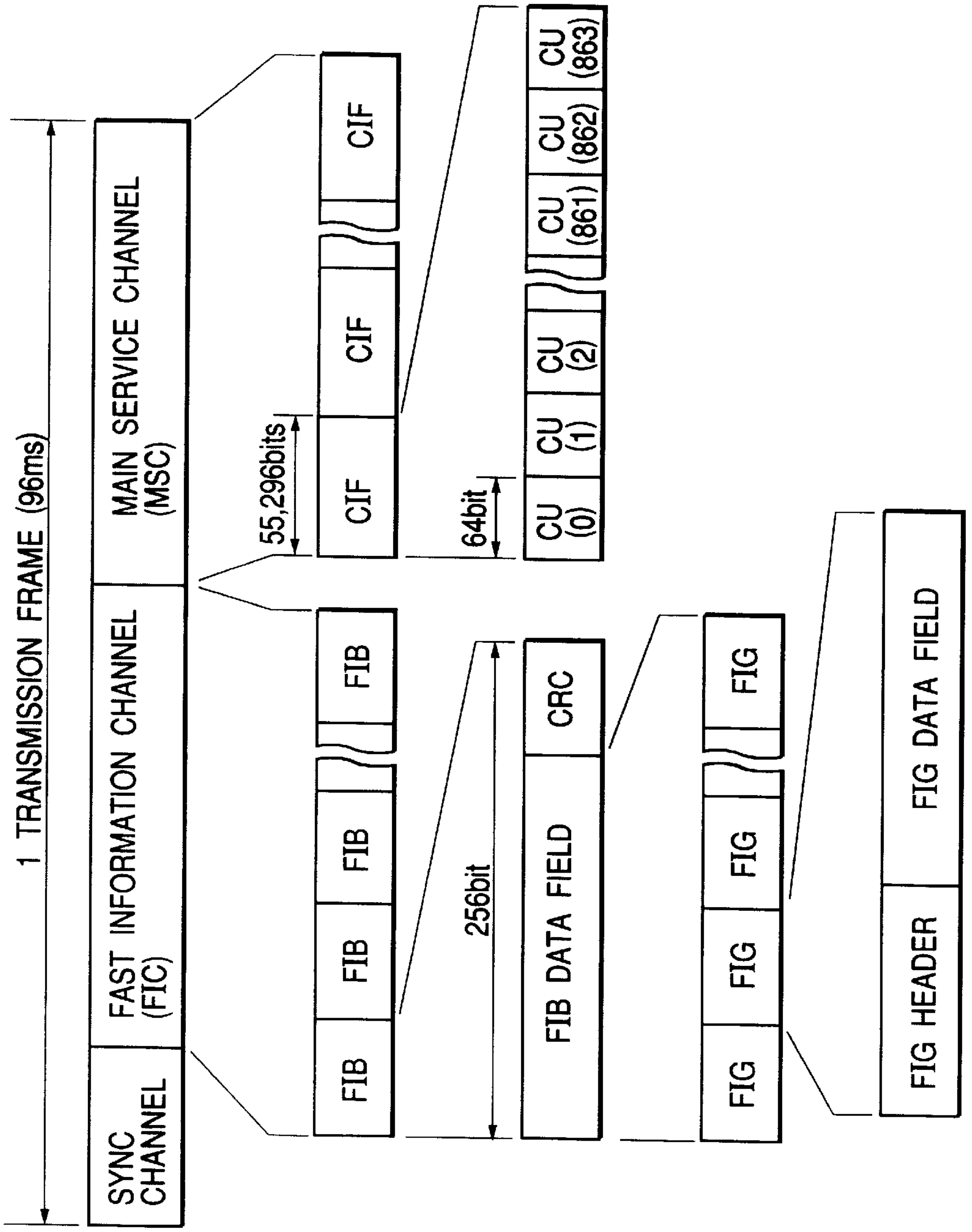
FIGS. 3A to 3E are illustrations showing data formats used for explaining a digital audio broadcasting signal received by the embodiment shown in FIG. 2.

The transmission frame has a time duration of, for example, 96 ms and contains three portions, a synchronous channel, a fast information channel (FIC) and a main service channel (MSC), as shown in FIG. 3A. The MSC is composed of a series of common interleaved frames (CIFs), as shown in FIG. 3B. Each of the CIFs corresponds to 55,296 bits and is composed of a series of 864 capacity units (CUs) identified with numbers (0) to (863), respectively, as shown in FIG. 3C. Each of the capacity units forms unit data corresponding to 64 bits. The MSC thus constituted transmits audio information and service information.

The FIC is composed of series of first information blocks (FIBs), as shown in FIG. 3B. Each of the FIBs corresponds to 256 bits and contains a couple of portions of a FIB data field and an error checking word CRC (Cyclic Redundancy Check), as shown in FIG. 3C. The FIB data field is composed of a series of first information groups (FIGs), as shown in FIG. 3D. Each of the FIGs contains a FIG header and a FIG data field, as shown in FIG. 3E. The FIC thus formed transmits control information, such as multiplex configuration information (MCI) and other information.

The tuning operation by the tuner 22 is performed in response to a tuning control signal CTD supplied from a control unit 40. In the tuner 22, the received digital audio broadcasting signal is subjected to an amplifying processing and a frequency-converting processing to produce an intermediate frequency (IF) signal SID. The IF signal SID is supplied to an analog to digital (A/D) convertor 23.

A digital IF signal DID corresponding to the IF signal SID is obtained from the A/D convertor 23 to be supplied to a quadrature demodulator 24. In the quadrature demodulator 24, the digital IF signal DID is subjected to a quadrature demodulation processing to produce I and Q signals DI and DQ which are a pair of quadrature demodulated output signals.

The I and Q signals DI and DQ obtained from the quadrature demodulator 24 are supplied to a fast Fourier transform (FFT) differential demodulator 25. In the FFT differential demodulator 25, each of the I and Q signals DI and DQ is subjected to transformation from a time domain signal to a frequency domain signal to produce control information data DCD representing control information transmitted through the FIC and composite data DXD composed of audio information data and service information data representing respectively audio information and service information transmitted through the MSC.

The audio information data and service information data constituting the composite data DXD have been subjected to time interleaving arrangements respectively to form time interleaved audio information data and time interleaved service information data. Each of the audio information data and service information data are composed of a series of logical frames each having a time duration of, for example, 24 ms and corresponding to the CIF. The time interleaving arrangement to which each of the audio information data and service information data have been subjected has been carried out to each interleaving completion segment consisting of, for example, successive sixteen logical frames. Each of the logical frames is composed of a series of 864 capacity units each forming the unit data corresponding to 64 bits.

The control information data DCD obtained from the FFT differential demodulator 25 are supplied directly to a Viterbi decoder 26, and the composite data DXD obtained from the FFT differential demodulator 25 are supplied to a program selector 27.

A program selection control signal CSP is also supplied to the program selector 27 from the control unit 40. In the program selector 27, a data selection process by which one of various kinds of program information data contained in the audio information data constituting the composite data DXD or one of various kinds of program information data contained in the service information data constituting the composite data DXD are selected to be extracted from the audio information data or service information data is carried out in response to the program selection control signal CSP. Thereby, time interleaved program information data DPD selected by the data selection processing are derived from the program selector 27 to a time de-interleaving portion 28.

In the time de-interleaving portion 28, the time interleaved program information data DPD are subjected to a time de-interleaving arrangement to be released from the time interleaving arrangement. In the time de-interleaving arrangement to which the time interleaved program information data DPD are subjected, first, capacity units DPU, each of which forms unit data constituting the time interleaved program information data DPD contained in successive sixteen logical frames derived from each of interleaving completion segments of the composite data DXD, are successively supplied from the time de-interleaving portion 28 to a memory control portion 29 to be stored once in a RAM 30 forming a memory portion, under the control by the memory control portion 29. Then, after the whole capacity units DPU each forming the unit data constituting the time interleaved program information data DPD contained in those successive sixteen logical frames are once stored in the RAM 30, the capacity units DPU stored in the RAM 30 are read from the RAM 30 in a predetermined de-interleaving manner to be supplied through the memory control portion 29 to the time de-interleaving portion 28 under the control of the memory control portion 29 so as to produce time de-interleaved program information data DPD' contained in a new group of successive sixteen logical frames. As a result, the time de-interleaved program information data DPD' are obtained in the time de-interleaving portion 28 and then derived from the time de-interleaving portion 28 in the form of time de-interleaved audio information data or time de-interleaved service data.

The RAM 30 is selected to have its bit capacity of, for example, 2 megabits which is larger than the bit capacity expressed with the formula: $64\times864\times16\times n/2$ and calculated to $64\times864\times16\times4/2=1,769,472\approx1.77$ megabits, provided that n equals to 4, in order to be able to provide an appropriate arrangement even in the case where such time interleaved program information data that have been subjected to the time interleaving arrangement carried out to each interleaving completion segment consisting of successive sixteen logical frames each provided with data in the whole capacity units contained therein to be in a full condition, are subjected to the time de-interleaving arrangement.

When the time interleaved program information data DPD are actually subjected to the time de-interleaving arrangement in the time de-interleaving portion 28, the quantity of data in the capacity units DPU constituting the time interleaved program information data DPD and contained in successive sixteen logical frames which are stored in the RAM 30 is expressed with the formula: $64\times140\times16\times n/2$ and calculated to $64\times140\times16\times2=286,720\approx0.3$ megabits, provided that n equals to 4 and the quantity of data contained in the time interleaved program information data DPD amounts to 140 capacity units at the maximum.

Accordingly, in the RAM 30 having the bit capacity of 2 megabits, only the bit capacity of 0.3 megabits or less of the bit capacity of 2 megabits is actually used for storing the capacity units DPU (unit data) constituting the time interleaved program information data DPD and contained in successive sixteen logical frames therein and reading the stored capacity units DPU therefrom when the time interleaved program information data DPD are actually subjected to the time de-interleaving arrangement in the time de-interleaving portion 28. That is, a relatively large part of the RAM 30 having the bit capacity of 2 megabits, which corresponds to the bit capacity of about 1.7 megabits or more of the bit capacity of 2 megabits, is not actually used for storing the capacity units DPU (unit data) constituting the time interleaved program information data DPD and contained in successive sixteen logical frames therein and reading the stored capacity units DPU therefrom when the time interleaved program information data DPD are actually subjected to the time de-interleaving arrangement in the time de-interleaving portion 28. This part of the RAM 30 is referred to as an unused part, hereinafter.

The time de-interleaved program information data DPD' obtained from the time de-interleaving portion 28 are supplied to the Viterbi decoder 26. In the Viterbi decoder 26, the control information data DCD from the FFT differential demodulator 25 and the time de-interleaved program information data DPD' from the time de-interleaving portion 28 are subjected respectively to error correction processings. The time de-interleaved program information data DPD' subjected to the error correction processing are supplied from the Viterbi decoder 26 to a program selector 31 and the control information data DCD subjected to the error correction processing are supplied from the Viterbi decoder 26 to the control unit 40.

A program selection control signal CPR is also supplied to the program selector 31 from a control unit 40. Audio program data DAD or service program data DSD which are obtained based on the time de-interleaved program information data DPD' subjected to the error correction processing from the Viterbi decoder 26 are derived from the program selector 31 in response to the program selection control signal CPR.

The audio program data DAD derived from the program selector 31 are supplied subjected to a high efficiency decoder 32 and the memory control portion 29. In the high efficiency decoder 32, the audio program data DAD are subjected to a high efficiency decoding by which data suppressed in accordance with a high efficiency coding are expanded to produce decoded audio data DA. Further, program associated data DPA which are contained in the audio program data DAD are obtained from the high efficiency decoder 32 to be supplied to the control unit 40.

Figure 1:
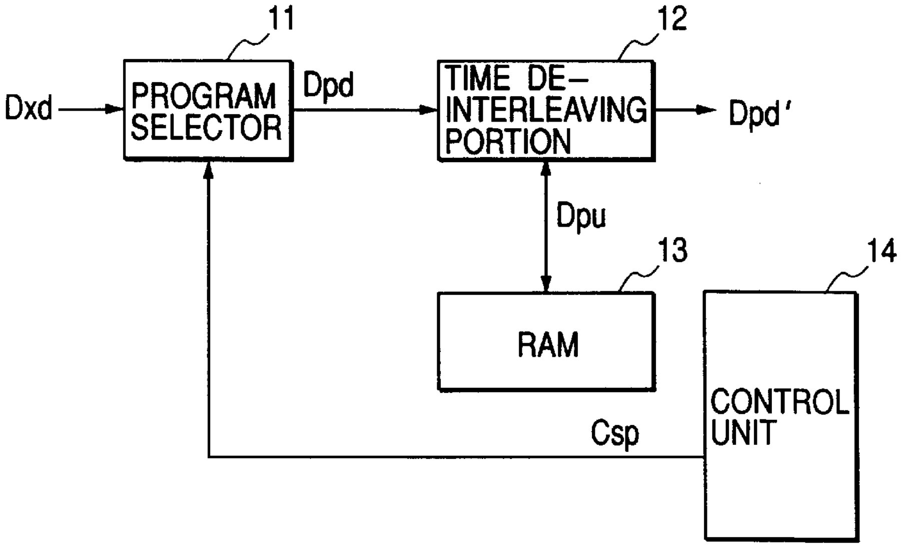
FIG. 1 (PRIOR ART)
FIG. 1 is a schematic block diagram showing an example of a previously proposed circuit structure used for a time de-interleaving arrangement to which time interleaved information data are subjected.
Figure 4:
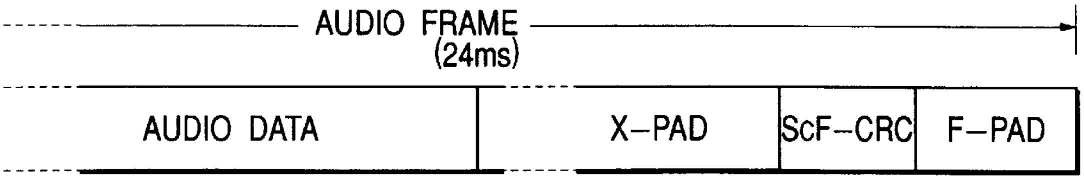
FIG. 4 is an illustration showing a data format used for explaining audio program data obtained by the embodiment shown in FIG. 2.

The program associated data DPA contained in the audio program data DAD contain, for example, variable program associated data X-PAD successive to audio data in an audio frame constituted by the audio program data DAD and fixed program associated data F-PAD, as shown in FIG. 4. ScF-CRC in the audio frame shown in FIG. 4 is an error detecting word for scale factor data contained in the audio frame (not shown in FIG. 4).

The decoded audio data DA obtained from the high efficiency decoder 32 are supplied to a digital to analog (D/A) convertor 33 to be converted to an analog sound signal forming a reproduced audio signal SA corresponding to the decoded audio data DA. The reproduced audio signal SA is derived from the D/A convertor 33 to an output terminal 34.

The service program data DSD derived from the program selector 31 are supplied to a decoder 35 and the control unit 40. In the decoder 35, the service program data DSD are subjected to a decoding processing to produce reproduced service data DS based on the service program data DSD. The reproduced service data DS are derived from the decoder 35 to an output terminal 36.

The control unit 40 is operative to produce control data DVD based on the control information data DCD from the Viterbi decoder 26, the program associated data DPA from the high efficiency decoder 32, a command signal CC supplied from an input portion 41 in response to manual operations thereto and so on and to supply the Viterbi decoder 26 with the control data DVD for controlling the operation of the Viterbi decoder 26.

The control unit 40 is operative also to supply the memory control portion 29 with data DYW which are selected control information data DCD from the Viterbi decoder 26, and to receive selected program associated data DPA from the high efficiency decoder 32 or packet data constituted by the service program data DSD from the program selector 31 in response to the command signal CC supplied from an input portion 41. As occasion demands, the control unit 40 is further operative to supply the memory control portion 29 with data used for data processings in the control unit 40 as the data DYW.

The memory control portion 29 to which the audio program data DAD from the program selector 31 and the data DYW from the control unit 40 are supplied is operative to store bitstreams based on the audio program data DAD in the unused part of the RAM 30 as data DZ and to read the data DZ stored in the unused part of the RAM 30 thereform in response to a control signal CDZ from the control unit 40 to be supplied to the control unit 40 as data DYR. Further, the memory control portion 29 is operative to store the data DYW from the control unit 40 in the unused part of the RAM 30 as data DZ and to read the data DZ stored in the unused part of the RAM 30 therefrom in response to the control signal CDZ from the control unit 40 to be supplied to the control unit 40 as data DYR.

Accordingly, the memory control portion 29 is operative substantially to store each of the selected control information data DCD, the selected program associated data DPA contained in the audio program data DAD obtained based on the time de-interleaved program information data DPD', the packet data constituted by the service program data DSD obtained based on the time de-interleaved program information data DPD', the bitstreams based on the audio program data DAD obtained based on the time de-interleaved program information data DPD' and the data used for data processing in the control unit 40 in the unused part of the RAM 30 and to read stored data from the unused part of the RAM 30, under the control by the control unit 40.

Each of the selected control information data DCD, the selected program associated data DPA, the packet data constituted by the service program data DSD, the bitstreams based on the audio program data DAD and the data used for data processings in the control unit 40, which are read from the unused part of the RAM 30 to be supplied to the control unit 40 as the data DYR, are used for operation controls by the control unit 40 to the tuner 22, program selector 27, Viterbi decoder 26, program selector 31 and so on.

Since the memory control portion 29 is operative substantially to store each of the selected control information data DCD, the selected program associated data DPA, the packet data constituted by the service program data DSD, the bitstreams based on the audio program data DAD and the data used for data processings in the control unit 40 in the unused part of the RAM 30 and to read the stored data from the unused part of the RAM 30, the RAM 30 provided for the time de-interleaving arrangement to which the time interleaved program information data DPD are subjected is used not only for storing the unit data constituting the time interleaved program information data DPD therein and reading the stored unit data therefrom when the time de-interleaving arrangement is carried out but also for storing the data other than the unit data in the unused part thereof and reading the stored data from the unused part thereof. Accordingly, the bit capacity of the RAM 30 can be effectively used without interfering with the time de-interleaving arrangement so that the RAM 30 is improved in efficiency of utilization.

Further, since the bit capacity of the RAM 30 is effectively used for storing and reading each of the selected control information data DCD, the selected program associated data DPA, the packet data constituted by the service program data DSD, the bitstreams based on the audio program data DAD and the data used for data processings in the control unit 40, a memory portion separately accompanying the control unit 40 for storing and reading those data can be omitted or reduced effectively in bit capacity.

In the embodiment shown in FIG. 2 and described above in conjunction with FIGS. 2, 3A to 3E and 4, a portion including the A/D convertor 23 to the program selector 27 constitutes a data demodulating portion for obtaining the time interleaved program information data DPD based on the digital audio broadcasting signal received by the tuner 22, a portion including the Viterbi decoder 26 and the program selector 31 to the D/A convertor 33 constitutes an audio signal reproducing portion for obtaining the reproduced audio signal SA based on the time de-interleaved program information data DPD' derived from the time de-interleaving portion 28, and a portion including the Viterbi decoder 26, the program selector 31 and the decoder 35 constitutes a service data reproducing portion for obtaining the reproduced service data DS based on the time de-interleaved program information data DPD' derived from the time de-interleaving portion 28.

What is claimed is:

1. An apparatus for receiving broadcasting signals comprising:

a tuning portion for selectively receiving digital audio broadcasting signals, a data demodulating portion for obtaining time interleaved information data based on the digital audio broadcasting signal received by said tuning portion, a time de-interleaving portion for causing said time interleaved information data obtained from said data demodulating portion to be subjected to time de-interleaving arrangement, an audio signal reproducing portion for obtaining a reproduced audio signal based on said time de-interleaved information data obtained from said time de-interleaving portion, a memory portion for storing unit data constituting said time interleaved information data therein and reading stored unit data therefrom when said time interleaved information data are subjected to said time de-interleaving arrangement, a memory control portion for controlling storage of said unit data constituting said time interleaved information data in said memory portion and reading of said stored unit data from said memory portion and operative to utilize a part of said memory portion which is not used for storing and reading said unit data for storing data other than said unit data therein and reading said stored data therefrom, and an operation control portion operative to control operations of said tuning portion, said data demodulating portion and said audio signal reproducing portion, wherein said memory control portion is operative to utilize said part of said memory portion which is not used for storing and reading said unit data for storing data used for data processings in said operation control portion therein and for reading said stored data therefrom.

2. The apparatus for receiving broadcasting signals according to claim 1 further comprising a service data producing portion for obtaining reproduced service data based on said time de-interleaved information data obtained from said time de-interleaving portion.

3. The apparatus for receiving broadcasting signals according to claim 1, wherein said memory control portion is operative to utilize said part of said memory portion which is not used for storing and reading the unit data for storing control information data therein and for reading said stored control information data therefrom.

4. The apparatus for receiving broadcasting signals according to claim 1, wherein said memory control portion is operative to utilize said part of said memory portion which not used for storing and reading the unit data for storing program associated data which are contained in the audio program data obtained based on said time de-interleaved information data therein and for reading said stored program associated data therefrom.

5. The apparatus for receiving broadcasting signals according to claim 1, wherein said memory control portion is operative to utilize said part of said memory portion which is not used for storing and reading said unit data for storing packet data obtained based on said time de-interleaved information data therein and for reading said stored packet data therefrom.

6. The apparatus for receiving broadcasting signals according to claim 1, wherein said memory control portion is operative to utilize said part of said memory portion which is not used for storing and reading said unit data for storing bit streams based on the audio program data obtained based on said time de-interleaved information data therein and for reading said stored bit streams therefrom.

* * * * *